United States Patent [19]

Koch, Jr.

[11] Patent Number: 4,762,103
[45] Date of Patent: Aug. 9, 1988

[54] ENGINE WITH SEALING HEAD SEAT RING

[75] Inventor: Julius F. Koch, Jr., Elmhurst, Ill.

[73] Assignee: General Motors Corporation, Detroit, Mich.

[21] Appl. No.: 122,549

[22] Filed: Nov. 13, 1987

Related U.S. Application Data

[63] Continuation of Ser. No. 899,988, Aug. 25, 1986, abandoned.

[51] Int. Cl.[4] .............................................. F01M 1/00
[52] U.S. Cl. ..................... 123/193 CH; 123/196 M; 277/180; 277/178; 277/183
[58] Field of Search ....... 123/193 H, 193 CH, 196 M; 277/180, 178, 183, 184

[56] References Cited

U.S. PATENT DOCUMENTS

| | | | |
|---|---|---|---|
| 3,171,662 | 3/1965 | Warn et al. | 277/211 |
| 3,355,181 | 11/1967 | Olson | 277/180 |
| 3,521,607 | 7/1970 | Wiseman et al. | 123/193 CH |
| 4,026,565 | 5/1977 | Jelinek | 277/180 |
| 4,158,757 | 6/1979 | Reichert et al. | 277/166 |
| 4,477,091 | 10/1984 | Adamek | 277/211 |
| 4,480,844 | 11/1984 | Kozerski | 277/217 |
| 4,565,380 | 1/1986 | Newman et al. | 277/183 |

Primary Examiner—E. Rollins Cross
Attorney, Agent, or Firm—Robert J. Outland

[57] ABSTRACT

In a diesel engine having an angled cylinder bank with an individual cylinder head received on a sloping mounting surface over which return oil flows, a cylinder head wear ring or seat ring is provided to accept wear between the head mounting flange and the mounting surface. The seat ring is modified to incorporate around its outer periphery a seal having resilient beads that engage the opposed mounting and head flange surfaces to prevent oil from passing through the joint and entering the engine exhaust system.

10 Claims, 2 Drawing Sheets

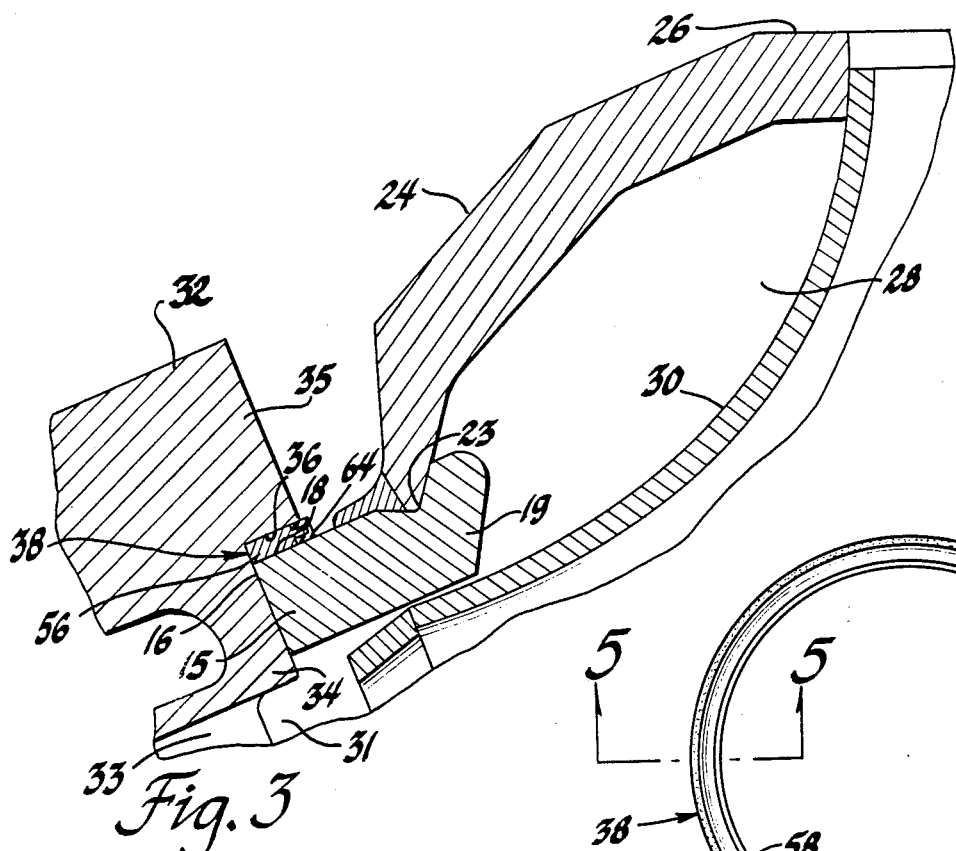
Fig. 3
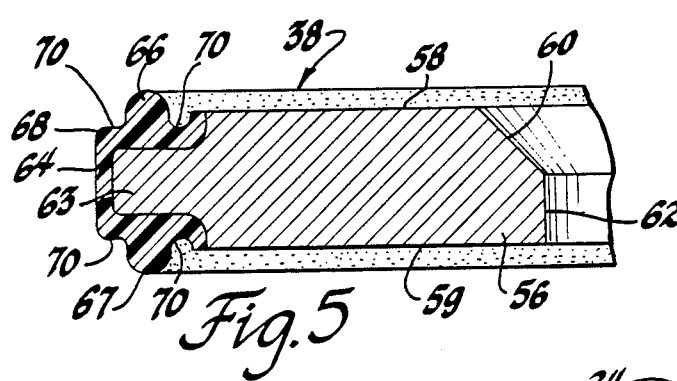
Fig. 5
Fig. 4
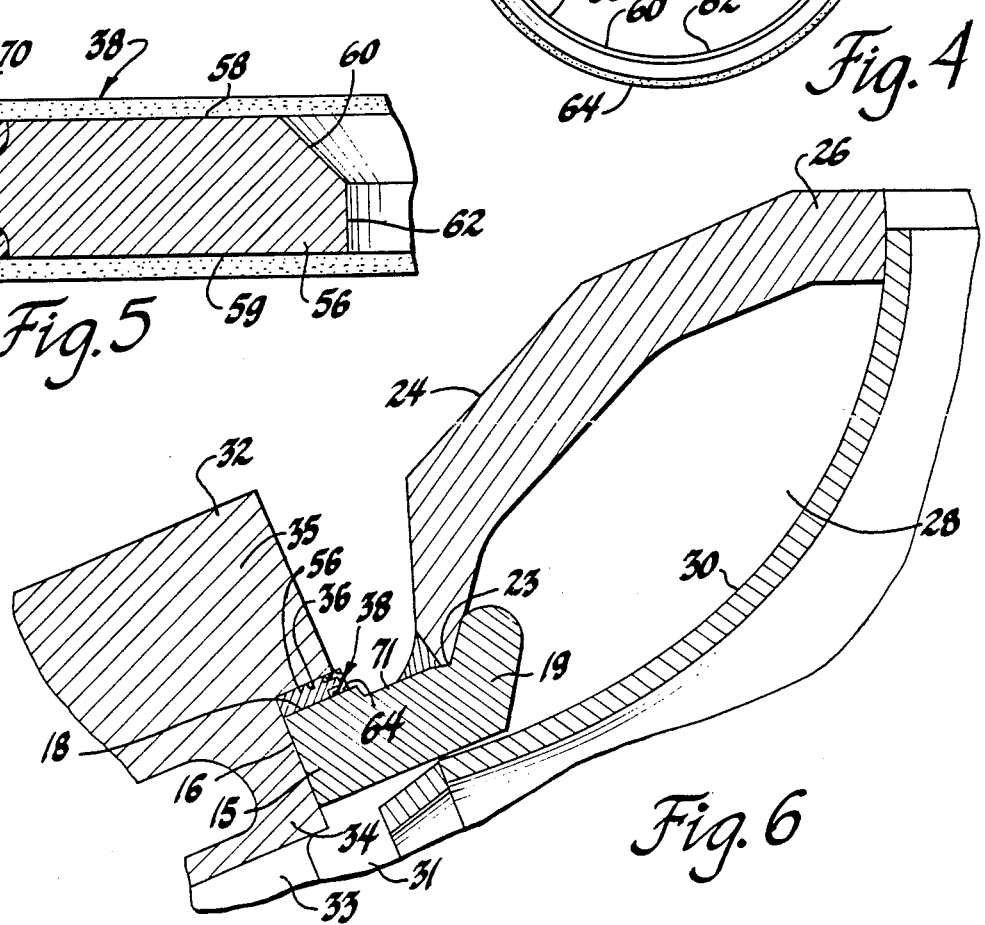
Fig. 6 ic # ENGINE WITH SEALING HEAD SEAT RING

CROSS REFERENCE

This is a continuation of abandoned patent application Ser. No. 899,988 filed Aug. 25, 1986, now abandoned.

TECHNICAL FIELD

This invention relates to diesel engines of the type having individual cylinder heads each received in a cylinder head retainer in a crankcase and wherein a wear ring, or seat ring, is provided to act as a support member and wear bearing between a supporting upper surface of each cylinder head retainer and a mating lower surface of its respective cylinder head. The invention further relates to a seat ring having seal means for preventing the leakage of lubricating oil past the seat ring and into the engine exhaust system.

BACKGROUND

It is known in the art relating to diesel engines to provide a fabricated crankcase including individual cylinder head retainers in which cylinder heads with attached cylinder liners are received and by which they are supported. A seat ring or wear ring of bearing material, such as bronze, is commonly provided at the joint where the cylinder head flange is supported on an upper surface of the cylinder head retainer. The seat ring is a replaceable wearing member that provides for any wear which may occur and seals against the leakage of oil into or gases out of the exhaust system passages located below the seat ring in the cylinder head and crankcase.

In certain engine constructions, lubricated camshaft and rocker mechanisms above the cylinder head and engine top deck discharge oil which runs along the upper crankcase walls and around the edges of the head seat ring from a sloping extension of the head retainer, thereby carrying the oil against the cylinder head to retainer joint.

Experience has shown that wear of the seat ring has most commonly occurred in the area above the cylinder head and crankcase exhaust passages, that is, the area at the upper edge of the sloping joint surface against which the lubricating oil returning to the engine sump is inclined to flow. Thus, where excessive wear of the seat ring has occurred, leakage of oil into the exhaust system and "souping" of the engine exhaust has sometimes resulted.

In a previous method of meeting this problem in some engines, an O-ring seal has been installed on each cylinder head at the juncture of the cylinder head body and flange, immediately above the cylinder head seat ring. While this modification has likely reduced the extent of the problem, the installation of the seal together and the seat ring together with the cylinder head and liner assembly has proved somewhat difficult and not always satisfactory in that pinching or mislocation of the seal may result. In addition, even if the O-ring seal is properly applied, its effect is to seal only the upper joint of the seat ring to cylinder head flange, allowing the possibility that some leakage may still occur between the lower surface of the seat ring and the cylinder head retainer upper surface.

SUMMARY OF THE INVENTION

The present invention provides a new combination cylinder head seat ring and seal assembly which incorporates a seal having upper and lower beads located along the outer edge of the cylinder head seat ring. When installed, it provides, in addition to the usual seat ring functions, sealing against oil leakage between both the upper and lower surfaces of the seat ring and the associated cylinder head flange and retainer as well as allowing easier installation of the assembly than the previously used separate seat ring and seal.

These and other features and advantages of the invention will be more fully understood from the following description of a preferred embodiment of the invention taken together with the accompanying drawings.

BRIEF DRAWING DESCRIPTION

In the drawings:

FIG. 3 is an enlarged transverse cross-sectional view of a portion of the engine top deck area illustrating details of the assembly with the cylinder head and seat ring installed;

FIG. 4 is a plan view of a seat ring assembly according to the invention;

FIG. 5 is a cross-sectional view of the seat ring from the plane indicated by the line 5—5 of FIG. 4; and FIG. 6 is a cross-sectional view similar to FIG. 3 but showing an alternative embodiment in which a portion of the crankcase upper wall is modified to deflect flowing oil away from the seat ring joint.

DETAILED DESCRIPTION

Figure 1:
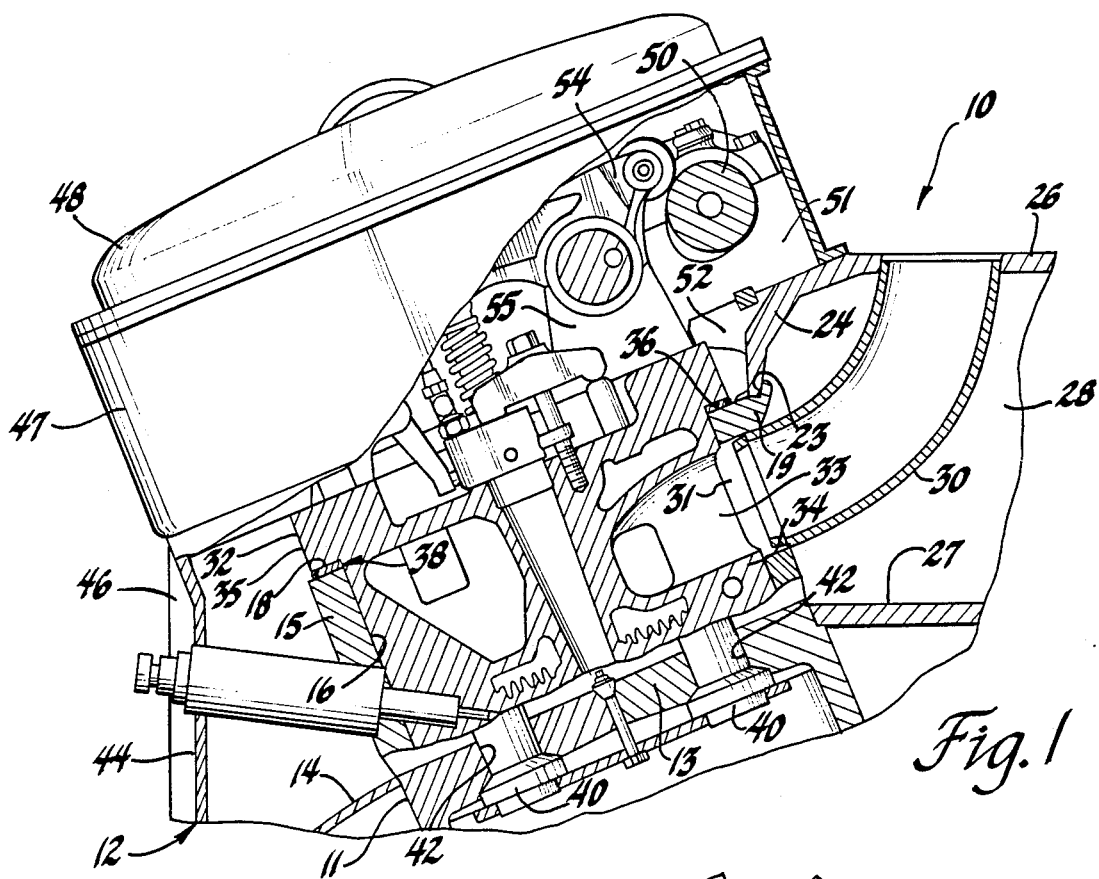
FIG. 1 is a fragmentary transverse cross-sectional view of a V-type two cycle diesel engine having a cylinder head supporting seat ring and seal arrangement in accordance with the invention.

Referring now to the drawings in detail, numeral 10 generally indicates an internal combustion engine of the two cycle diesel type having two V-arranged cylinder banks 11, each located at a substantial angle from vertical and only one of which is shown. The cylinder banks are part of a fabricated crankcase 12 that includes a box section upper wall 13 connecting with a curved side sheet 14 and having a sloping upper portion on which there are supported a plurality of forged cylinder head retainers 15, only one being shown.

Each of the cylinder head retainers includes a generally cylindrical wall 16 having an annular upper surface 18. Extending from the cylinder head retainer upper edge is an upwardly sloping longitudinal wall 19 having a water outlet opening 20 at one side thereof. Inwardly and longitudinally extending wings of the cylinder head retainer forgings are joined to provide an inner wall 22 between the cylindrical head retainer portions and connected at its upper edge with the longitudinal wall 19. There, a ledge 23 is provided to which a downwardly curving longitudinally extending wing 24 of an engine top deck 26 is welded.

An intermediate deck plate 27 extends between the cylinder banks 11 below the top deck 26 and defines, with the top deck and inner wall 22, a water manifold 28 to which the water outlet openings 20 are connected by internal passages not shown. At each cylinder location, a curved exhaust elbow 30 is welded within the water manifold 28. The elbow extends between a horizontal upper portion of the top deck 26 and an oblong opening 31 on the inner side of the cylindrical wall 16 of each of the cylinder head retainers 15.

In each of the engine cylinder banks, there is installed at each cylinder location a cylinder head and liner assembly which includes a cylinder head 32. The cylinder head has a downwardly extending body portion 34 and an outwardly extending flange 35 at the upper edge of the body portion. The flange includes an annular lower surface 36 which, in assembly, is located in closely opposed relation to the annular upper surface 18 of the associated cylinder head retainer. A cylinder head seat ring 38 is located between these surfaces in a manner and of a construction to be subsequently more fully described.

Each cylinder and liner assembly is secured in place by retainer blocks or crabs, not shown. These engage the top surface of the flange 35 and are held in place by nuts, not shown, on upper ends of studs 40 received in openings 42 in the upper wall 13 of the cylinder bank box section on which the cylinder head retainers 15 are supported.

Within the cylinder head retainers 15, exhaust ports 33 in the cylinder head body portion communicate with openings 31 and the exhaust elbows 30 for carrying exhaust gases from the engine cylinders to an external exhaust manifold not shown.

Outwardly of the cylinder head retainers, the crankcase 12 further includes longitudinally extending side plates 44. These, together with end plates 46 and the top deck 26, form rails mounting a top deck cover frame 47, upwardly closed by openable or removable top deck covers 48. Within the cover frame and above the top deck and cylinder heads, there are provided oil lubricated mechanisms including a camshaft 50 carried by bearing blocks 51 on pads 52 extending from the upper deck 26 and rocker arms 54 carried by supports 55 mounted on the cylinder heads.

In operation of the engine, changes in operating temperatures over an extended period of time, particularly temperature changes in the longitudinal wall portion 19 above the exhaust elbow 30, are believed to cause a small amount of relative motion between the annular upper surface 18 of each cylinder head retainer and the opposed annular lower surface 36 of the flange of its respective cylinder head 32. This motion over a period of time is believed to be the primary cause of wear of the cylinder head seat ring 38, which occurs particularly in the area toward the inner edge of the seat ring which is at the upper portion of the upwardly sloping surface 18 of the head retainer. Against this surface, and the joint filled by the seat ring 38, lubricating oil draining down from the camshaft 50, and to some extent the rocker arms 54, is collected on the upper surfaces of the top deck wing 24 and the connected longitudinal wall 19 and runs down against the joint closed by the seat ring 38.

When the seat ring wear is sufficiently great, this action, in prior engine assemblies, may allow the leakage of lubricating oil past the upper or lower surfaces of the seat ring 38 and through the joint into the space between the cylinder head body portion 34 and the interior of the retainers 15. Here the oil may be picked up by the flowing exhaust gases resulting, especially just after engine starting, in a condition of oil or smoke discharge from the exhaust stack which is commonly referred to as "souping". This undesirable condition is averted, or at least reduced, in the present invention by the installation of the seat rings which are of novel design.

The form of the seat rings 38 is best shown in FIGS. 4 and 5, where ring 38 is seen to include an annulus 56 of high strength bearing material, such as long wearing bronze. The annulus includes parallel upper and lower sides 58, 59 respectively, a chamfer 60 at the inner diameter 62 adjacent the upper surface and a reduced thickness protrusion 63 along the outer diameter.

On the protrusion 63 there is molded or cemented a seal 64 in the form of a U-shaped body of resilient high temperature seal material extending around the protrusion 63 and terminating at the outer edges of the upper and lower sides 58, 59 of the annulus 56. Upper and lower beads 66, 67, respectively, extend annularly around and beyond the upper and lower surfaces 58, 59, respectively, slightly inwardly from the outer periphery 68 of the seal and the supporting protrusion 63 of the annulus.

When the engine is fully assembled with the seat rings 38 installed, as is best shown in FIG. 3, the metal annulus 56 engages the opposing surfaces 18, 36 of the retainer and head flange, respectively, to properly position and support the head and liner assembly and provide the desired bearing material wear element between the facing surfaces. At the same time, the upper and lower beads 66, 67 also engage the opposing surfaces 36, 18 to provide a seal against oil entry from the upwardly sloping longitudinal wall 19 and the top deck wing 24 above it. Recesses 70 on both sides of the beads 66, 67 allow flattening of the beads into the space provided without overstressing or excessively setting the resilient seal material. Thus, upon removal for service, the seat ring assembly 38 with its integral seal 64 may be reused unless it has been damaged in handling.

Figure 2:
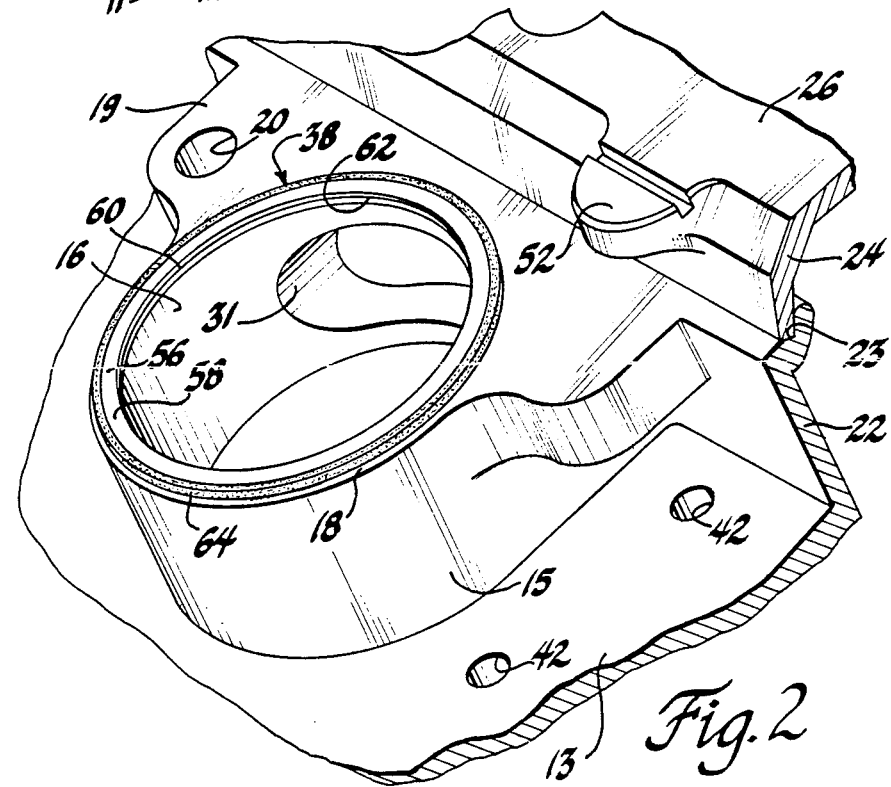
FIG. 2 is a fragmentary pictorial view showing one cylinder location in the crankcase of the engine of FIG. 1 with the cylinder head seat ring of the invention shown in its assembled position.

It should be noted that the arrangement of FIG. 2, showing the seat ring 38 in assembled position on the upper surface 18 of the head retainer is not an indication of its proper method of installation. Instead, in order to prevent damage to the seat ring during installation, it is properly installed in conventional fashion by sliding the seat ring over the assembled cylinder liner and cylinder head, where it hangs on the body portion of the cylinder head while the liner and head assembly are lowered through and into the cylinder head retainer. The seat ring 38 then reaches the installed position, indicated in FIG. 2, only shortly before the cylinder head reaches its installed position as shown in FIG. 3. This method of assembly avoids the possibility of damaging the seat ring while trying to insert the cylinder liner into the cylinder head retainer.

Referring now to FIG. 6, there is shown an alternative embodiment of the invention wherein most of the components of the engine assembly, shown in part, are identical to those of the previous embodiment so that like reference numerals are used for like parts. The arrangement of FIG. 6 differs in that, during machining of the longitudinal wall 19 to receive the lower end of the wing 24, a recess 71 is formed in the upper surface of wall 19. This recess extends outward of the cylinder head flange 35 and, preferably, around the periphery of the head retainer upper surface 18 to provide a drain channel in the longitudinal wall 19 to carry lubricating oil, running down from the wing 24, around the joint occupied by the seat ring assembly 38. In this manner, the amount of oil coming into contact with the seat ring closed joint is reduced and the chance of leakage of oil into the engine exhaust system is thereby minimized.

While the invention has been described by reference certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

The embodiments of the invention in which an exclusive property or privilege is claimed are defined as follows:

1. In combination in a diesel engine,
   a crankcase having a cylinder bank disposed at a substantial angle from vertical and supporting at least one cylinder head retainer with an annular upper surface sloping upwardly toward an edge at one side of the cylinder bank, a longitudinal wall extending inwardly and upwardly from adjacent said one side of the upper surface, and an exhaust passage opening into the head retainer on said one side, below said edge of the annular upper surface and the longitudinal wall,
   a cylinder head received in said retainer and including an exhaust outlet opening aligned within the head retainer with the crankcase exhaust passage and a radially extending flange having an annular lower surface above and in closely opposed relation to the retainer annular upper surface,
   oil lubricated mechanism disposed above the cylinder head and said longitudinal wall of the crankcase, and
   an annular metallic seat ring having annular lower and upper faces between and engaging the upper surface of the head retainer and the lower surface of the head flange to limit the wear thereof and seal the gap between them, wherein the improvement comprises
   a resilient seal portion on the seat ring outer periphery and including upper and lower annular beads respectively engaging in assembly the lower surface of the cylinder head flange and the upper surface of the head retainer to maintain a seal against the entry of lubricating oil into the interior of the head retainer and the exhaust passage even though adjacent metallic portions of the seat ring become worn in service.

2. A combination as in claim 1 wherein said longitudinal wall has a recessed portion immediately adjacent to and upslope from said one side of the retainer annular upper surface so as to form a drain channel around the edge of the elevated side of said upper surface to carry away from said surface lubricating oil draining downwardly from the lubricated mechanism, thereby reducing the volume of oil flow against said seal portion and the associated seat ring.

3. In combination in a diesel engine,
   a crankcase having a cylinder bank disposed at a substantial angle from vertical and supporting at least one cylinder head retainer with an annular upper surface sloping upwardly toward an edge at one side of the cylinder bank, a longitudinal wall extending inwardly and upwardly from adjacent said one side of the upper surface,
   a cylinder head received in said retainer and including a radially extending flange having an annular lower surface above and in closely opposed relation to the retainer annular upper surface, and
   an annular metallic seat ring having annular lower and upper faces between and engaging the upper surface of the head retainer and the lower surface of the head flange to limit the wear thereof and seal the gap between them, wherein the improvement comprises
   a resilient seal portion on the seat ring outer periphery and including upper and lower annular beads respectively engaging in assembly the lower surface of the cylinder head flange and the upper surface of the head retainer to maintain a seal against the entry of lubricating oil into the interior of the head retainer even though adjacent metallic portions of the seat ring become worn in service.

4. A combination as in claim 3 wherein said longitudinal wall has a recessed portion immediately adjacent to and upslope from said one side of the retainer annular upper surface so as to form a drain channel around the edge of the elevated side of said upper surface to carry away from said surface lubricating oil draining downwardly thereon, thereby reducing the volume of oil flow against said seal portion and the associated seat ring.

5. An annular seat ring for use in a diesel engine including
   a crankcase having a cylinder bank disposed at a substantial angle from vertical and supporting at least one cylinder head retainer with an annular upper surface sloping upwardly toward an edge at one side of the cylinder bank, a longitudinal wall extending inwardly and upwardly firm adjacent said one side of the upper surface, and an exhaust passage opening into the head retainer on said one side, below said edge of the annular upper surface and the longitudinal wall,
   a cylinder head received in said retainer and including an exhaust outlet opening aligned within the head retainer with the crankcase exhaust passage and a radially extending flange having an annular lower surface above and in closely opposed relation to the retainer annular upper surface, and
   oil lubricated mechanism disposed above the cylinder head and said longitudinal wall of the crankcase,
   said annular seat ring having a metallic body including annular lower and upper faces for location between and engaging the upper surface of the head retainer and the lower surface of the head flange to limit the wear thereof and seal the gap between them, and wherein the improvement comprises
   a resilient seal portion on the outer periphery of the metallic body and including upper and lower annular beads for respectively engaging in assembly the lower surface of the cylinder head flange and the upper surface of the head retainer to maintain a seal against the entry of lubricating oil into the interior of the head retainer and the exhaust passage even though adjacent portions of the seat ring metallic body become worn in service.

6. A seat ring as in claim 5 wherein said outer periphery of the metallic body includes a reduced thickness protrusion recessed from said lower and upper surfaces and said seal portion has a U-shaped cross section extending about said protrusion with upper and lower sides from which the beads extend beyond said upper and lower surfaces of the metallic body prior to installation, said sides of the seal portion being recessed from said body surfaces on either side of said beads to provide compression volume for the beads when compressed to the level of the body surfaces upon installation.

7. A seat ring as in claim 6 wherein said reduced thickness protrusion extends about the complete perimeter of the seat ring body and said seal portion forms a complete annulus mounted on the protrusion.

8. An annular seat ring for use in a diesel engine including
- a crankcase having a cylinder bank disposed at a substantial angle from vertical and supporting at least one cylnder head retainer with an annular upper surface sloping upwardly toward an edge at one side of the cylinder bank, a longitudinal wall extending inwardly and upwardly from adjacent said one side of the upper surface, and
- a cylinder head received in said retainer and including a radially extending flange having an annular lower surface above and in closely opposed relation to the retainer annular upper surface,
- said annular seat ring having a metallic body including annular lower and upper faces for location between and engaging the upper surface of the head retainer and the lower surface of the head flange to limit the wear thereof and seal the gap between them, and wherein the improvement comprises
- a resilient seal portion on the outer periphery of the metallic body and including upper and lower annular beads for respectively engaging in assembly the lower surface of the cylinder head flange and the upper surface of the head retainer to maintain a seal against the entry of lubricating oil into the interior of the head retainer even though adjacent portions of the seat ring metallic body become worn in service.

9. A seat ring as in claim 8 wherein said outer periphery of the metallic body includes a reduced thickness protrusion recessed from said lower and upper surfaces and said seal portion has a U-shaped cross section extending about said protrusion with upper and lower sides from which the beads extend beyond said upper and lower surfaces of the metallic body prior to installation, said sides of the seal portion being recessed from said body surfaces on either side of said beads to provide compression volume for the beads when compressed to the level of the body surfaces upon installation.

10. A seat ring as in claim 9 wherein said reduced thickness protrusion extends about the complete perimeter of the seat ring body and said seal portion forms a complete annulus mounted on the protrusion.

* * * * *